Dec. 19, 1933.  A. BOUSFIELD  1,940,576
WEIGHING MACHINE
Filed Nov. 1, 1928
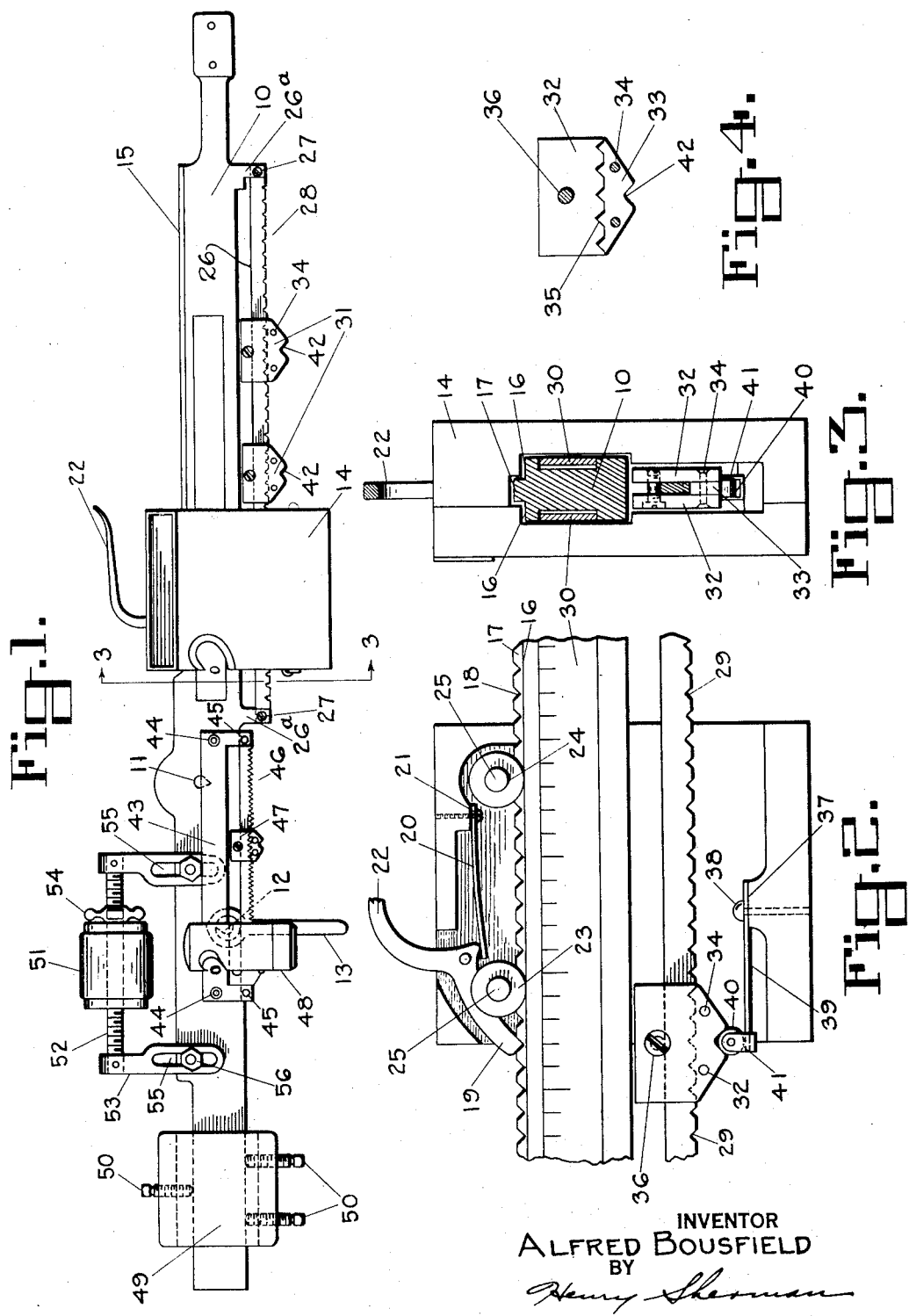
INVENTOR
ALFRED BOUSFIELD
BY
Henry Sherman
ATTORNEY Patented Dec. 19, 1933

1,940,576

UNITED STATES PATENT OFFICE 1,940,576

WEIGHING MACHINE

Alfred Bousfield, St. Johnsbury, Vt., assignor to E. and T. Fairbanks and Company, St. Johnsbury, Vt., a corporation of Vermont Application November 1, 1928. Serial No. 316,405

8 Claims. (Cl. 265—49)

My invention relates to improvements in weighing machines of the beam type, but this invention has more particular relation to weighing machines of the beam type in which means are provided to be used in connection with the weigh-beam for weighing out definite quantities of ingredients of a mixture or a furnace charge.

In devices of the class referred to as heretofore commonly constructed, the stops were frictionally held in adjusted positions on the scale beam by means of a screw-threaded bolt and nut. The disadvantage of this construction, and one which tended to lower considerably the efficiency of these devices, resided in the ease, relatively speaking, with which the stops could be shifted from their adjusted positions on the beam though the bolts were but slightly worn. This defect in the construction of the stops became manifest when the poise was moved along the beam during a weighing operation, the stops receiving the impact of the pawl carried by the poise with the result that the stops were forced from their adjusted positions thus spoiling the mixture or charge by varying the true proportion of its ingredients.

It is accordingly an object of this invention to provide an improved weighing machine which will be free from the above-mentioned and other disadvantages and which will be especially simple in construction and efficient in operation.

Another object of this invention is the provision of improved means for locating the poise on the scale beam during a weighing operation. In the illustrative construction this means comprises a series of stops adapted to be fixed in any desired positions with relation to the scale beam for cooperation with a member carried by the poise for locating the latter.

Other features of this invention, together with certain details of construction and combinations of parts, will be described in the specification and pointed out in the appended claims.

In the drawing:

Figure 1 is a side elevational view of a scale beam in which my invention is embodied;

Figure 2 is an enlarged fragmental view with the front section of the poise removed to show certain details of construction;

Figure 3 is a vertical sectional view taken on line 3—3 in Fig. 1; and

Figure 4 is a detail view of a stop, one plate being removed.

Similar characters of reference indicate corresponding parts throughout the several views of the drawing.

In the illustrative embodiment of the invention there is shown a weigh-beam 10 of the type employed in the construction of platform scales, the weigh-beam 10 having set therein a fulcrum pivot 11 and a load pivot 12. The latter supports a loop 13 which is adapted to be connected in the usual manner to the lever system of a platform scale. The reference numeral 14 indicates a main poise mounted on and adjustable along the weigh-beam 10.

The upper edge of the weigh-beam is made in the form of a track 15 comprising a pair of spaced parallel portions 16 which are arranged along the marginal edges of the weigh-beam. Extending between and above these parallel portions is a longitudinal rib 17 provided with notches 18 which are adapted to be engaged by a pawl 19 pivotally carried by the poise 14. The pawl is normally held in contact with the weighbeam by means of a flat spring 20 secured to the poise 14 by means of a screw 21 and is adapted to be disengaged therefrom by depressing a lever 22 formed integral with and which is offset from said pawl.

As the poise 14 is relatively heavy, it is preferably supported from the weigh-beam by antifriction means, which in the present embodiment of the invention comprise a pair of rollers 23 and 24, said rollers being provided with trunnions 25 suitably journaled in the walls of the poise. The rollers are adapted to ride along track 15.

Depending from the weigh-beam 10, and integral therewith is a beam bar 26 mounted on depending lugs 26a to which is suitably secured as by means of screws 27, a flat beam bar 28, said bar being parallel to said weigh-beam. The beam bar is provided with notches 29 which correspond to the notches 18 in the longitudinal rib 17 on the weigh-beam 10. It will be understood that both sets of notches correspond to the graduations marked on plate 30 suitably attached to the weigh-beam 10, there being a notch on the rib 17 and beam bar 28 for each graduation on the plate 30.

The notched beam bar 28 carries a series of stops 31, one for each ingredient to be weighed, the stops being adapted to be set at any desired positions on the bar. The stops are of lamellar construction and comprise side plates 32 and a substantially triangular plate 33 secured therebetween by means of rivets 34. The latter is provided with teeth 35 adapted to enter the notches 29 formed in the beam bar 28. The stops are slipped on the beam bar 28 in the desired positions and are retained in said positions by a screw 36 which connects the plates 32. It will be readily apparent that by virtue of the meshing action of the notches formed in the beam bar and the teeth of the stop, it is virtually impossible to unintentionally move a stop from its set position with relation to the beam.

The poise 14 has cast integral therewith a boss 37 to which is attached, by means of a rivet 38, a flat spring 39 at the free end of which is carried a roller 40 preferably journaled in a clevis 41. This spring-pressed roller is adapted to engage a notch 42 formed in the base of each stop for the purpose of positioning the poise to weigh out the proper amount of an ingredient. After one ingredient has been weighed out, the poise is moved along the beam until it engages the succeeding stop, which represents the total amount of the two ingredients, where again a weighing operation is performed.

As the graduations on the main beam indicate divisions of large weight, the beam is provided with an auxiliary beam 43 adjacent to the fulcrum pivot 11 and the load pivot 12 for the purpose of weighing fractional quantities. The auxiliary beam is secured to the main rider preferably by stud bolts 44 and has secured thereto by any suitable means, as screws 45, a notched bar 46. The latter carries thereon a stop 47 substantially similar to stops 31. An auxiliary poise 48 is slidably mounted on the auxiliary beam 43 and has secured thereto a spring-pressed roller (not shown) similar to roller 40 which is adapted to engage the stop 47.

On the butt end of the main beam is carried the usual balance weight 49 which is adjustable longitudinally of said main beam for the purpose of initially balancing the weighbeam. Set screws 50 are employed to retain the balance weight in adjusted position. In order to complete the precise balancing of the beam at the zero, or no load, position after the stops 31 and 47 have been fixed in the desired positions on their respective notched bars, there is provided a balance ball 51 longitudinally adjustable on a threaded rod 52 mounted in the upper extremities of a pair of standards 53. A lock nut 54 retains the balance ball in adjusted position. The standards 53 are preferably slotted at 55 in order to allow vertical shifting of the balance ball and bolts 56 are employed to secure said standards to the weigh-beam.

The operation of the device will be apparent from the foregoing description.

Having thus described my invention, what I claim as new and desire to secure by Letters Patent of the United States is:

1. In a scale of the character described the combination with a weigh-beam, of a beam poise movably mounted thereon, a beam bar depending from the weigh-beam and having notches on its lower edge, ingredient weight indicating stops, each provided with a notched base and being adjustably mounted on the said beam bar according to the weight desired, and means mounted in the base of the beam poise adapted to engage the notch in the base of each of the said stops and thereby lock the poise in the particular, selected weighing position of the co-operating stop with relation to the weigh-beam.

2. In a scale of the character described the combination with a weigh-beam, of a beam poise movably mounted thereon, a beam bar depending from the weigh-beam and having notches in its lower edge, ingredient weight indicating stops, each provided with a notched base and being adjustably mounted on the said beam bar according to the weight desired, and resiliently mounted means carried in the base of the said beam poise and adapted to engage the notched means in the base of each stop and thereby arrest and hold the said beam poise in the selected weighing position.

3. In a scale of the character described the combination with a weigh-beam, of a beam poise movably mounted thereon, a beam bar depending from the weigh-beam and having notches in its lower edge, ingredient weight indicating stops, each provided with a notched base and an upper toothed portion adapted to engage the said notches on the said bar of the beam bar and thus fixedly locate the stop at the desired weight indication, and means mounted in the base of the beam poise and adapted to engage the notch in the base of each of the said stops and thereby lock the poise in the particular, selected weighing position of the co-operating stop with relation to the weigh-beam.

4. In a scale of the character described the combination with a weigh-beam, of a beam poise movably mounted thereon, a beam bar depending from the weigh-beam and having notches in its lower edge, ingredient weight indicating stops, each comprising spaced upstanding side plates having secured therebetween a substantially triangular member provided with a notched upper portion adapted to engage the said notches on the bar of the beam bar at the desired weight indicating position thereon, the said stop member being provided also with a notched base.

5. In a scale of the character described the combination with a weigh-beam, of a beam poise movably mounted thereon, a beam bar depending from the weigh-beam and having notches in its lower edge, ingredient weight indicating stops, each comprising spaced upstanding side plates having secured therebetween a substantially triangular member provided with a notched upper portion adapted to engage the said notches in the bar of the beam bar at the desired weight indicating position thereon, the said stop member being provided also with a notched base, and means for retaining the said stops in their selected positions comprising a transversely mounted screw connecting the said upstanding side plates and riding on the upper edge of the beam bar.

6. In a scale of the character described the combination with a weigh-beam provided with fulcrum and load pivots, of a main poise slidably mounted thereon, a main bar depending from the free end of the weigh-beam for weighing particular unit quantities of ingredients, an auxiliary bar for weighing fractional quantities of ingredients depending from the butt end of the weigh-beam adjacent to the fulcrum and load pivots thereof, a poise likewise slidably mounted on the auxiliary bar, each main and auxiliary beam bar having notches therein, ingredient weight indicating stops adjustably mounted on each of the said beam bars, and a toothed member carried by each of the said stops adapted to engage its respective, co-operating notched beam bar and to co-operate therewith in fixedly locating the stop in the desired position on its respective bar.

7. In a scale of the character described the combination with a weigh-beam provided with fulcrum and load pivots, of a main poise slidably mounted thereon, a main bar depending from the free end of the weigh-beam for weighing particular unit quantities of ingredients, an auxiliary bar for weighing fractional quantities of ingredients depending from the butt end of the weigh beam adjacent to the fulcrum and load pivots thereof, a poise likewise slidably mounted on the auxiliary rider, each main and auxiliary beam bar having notches therein, ingredient weight indicating stops adjustably mounted on each of the said beam bars, a toothed member carried by each of the said stops having an upper toothed portion adapted to engage its respective, co-operating notched beam bar and to co-operate therewith in fixedly locating the stop in the desired position on its respective bar, notched means in the base of the said toothed member, and means mounted in the base of the said main and auxiliary poises adapted to co-operate with the notched means in the base of the said toothed member of each stop in holding and locking the respective poise temporarily in a fixed postion at each stop in order to weigh a predetermined quantity of a particular ingredient represented by the said stop.

8. In a scale of the character described the combination with a weigh-beam provided with fulcrum and load pivots, of a main poise slidably mounted thereon, a main bar depending from the free end of the weigh beam for weighing particular unit quantities of ingredients, an auxiliary bar for weighing fractional quantities of ingredients depending from the butt end of the weigh beam adjacent to the fulcrum and load pivots thereof, a poise likewise slidably mounted on the auxiliary beam bar, a horizontal depending bar having notches therein for each main and auxiliary beam bar, ingredient weight indicating stops adjustably mounted on each of the said beam bars, a toothed member carried by each of the said stops having an upper toothed portion adapted to engage its respective, co-operating notched beam bar and to co-operate therewith in fixedly locating the stop in the desired position on its respective bar, the said toothed member being also provided with a notched base, and resilient means carried in the base of each of the said main and auxiliary poises comprising a flat spring carrying at its free end a roller adapted to engage the notched base of each of the particular co-operating stops, whereby the respective poise may be positioned and locked at the proper points to weigh predetermined quantities of ingredients.

ALFRED BOUSFIELD.